T. A. EDISON.
SOUND RECORD.
APPLICATION FILED APR. 5, 1911.
1,119,142.
Patented Dec. 1, 1914.
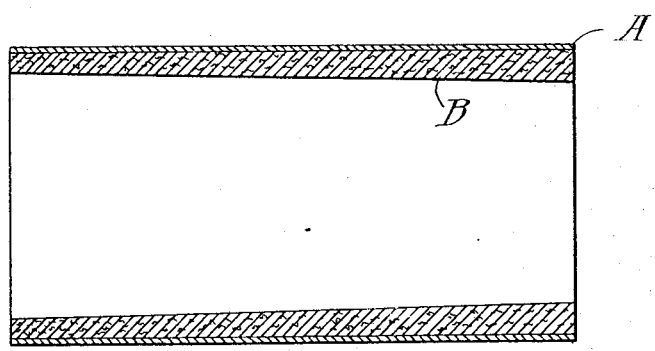

UNITED STATES PATENT OFFICE.

THOMAS A. EDISON, OF LLEWELLYN PARK, WEST ORANGE, NEW JERSEY, ASSIGNOR TO NEW JERSEY PATENT COMPANY, OF WEST ORANGE, NEW JERSEY, A CORPORATION OF NEW JERSEY.

SOUND-RECORD.

1,119,142.  Specification of Letters Patent.  Patented Dec. 1, 1914.

Application filed April 5, 1911. Serial No. 619,011.

*To all whom it may concern:*

Be it known that I, THOMAS A. EDISON, a citizen of the United States, and a resident of Llewellyn Park, West Orange, in the county of Essex and State of New Jersey, have invented certain new and useful Improvements in Sound-Records, of which the following is a description.

My invention relates to an improved sound record preferably of that type which consists of a base or backing of one material, usually a molded material, and an outer surface or covering of another material which receives the sound record.

The main object of my invention is to produce a record which can be cheaply and readily produced, which will be strong and durable, have very little surface noise on reproduction, the record itself permitting a large number of reproductions without sensible wear, and which will be effective in every way for the purpose of recording and reproducing sounds.

Another object of my invention is to construct the parts of the record—that is to say the base or backing and the outer covering of sound recording material—of substances which have the same or practically the same coefficient of expansion under changes of temperature, whereby both parts of the phonogram blank are made to expand and contract equally and the cracking of the outer surface material does not occur.

Other objects of my invention will appear more fully in the following specification and appended claims.

I prefer to employ for the outer record surface, a thin coating or layer of a hard substance solid at ordinary temperatures and preferably composed of a resinous body, like shellac, with which is combined a substance such as tetra-chloronaphthalene, dinitrobenzol or naphthalene which when melted will take up or become emulsified with the shellac but which will crystallize out from the shellac on cooling. While various substances can be combined with shellac to produce my preferred surface composition, I find that the most satisfactory results are obtained with tetra-chloronaphthalene; and, therefore, prefer to use the same. In practice, the tetra-chloronaphthalene is melted and the shellac in powdered form is gradually added, while the melted liquid is being agitated by a stirrer Or a powder containing the tetra-chloronaphthalene and shellac in proper proportion may be gradually added to a liquid of the same composition which is being agitated. The tetra-chloronaphthalene should be in approximately the proportion of one-fourth of the shellac by weight, although a less proportion of the tetra-chloronaphthalene may be used. When the substance cools and solidifies, the tetra-chloronaphthalene separates out and will be found distributed through the mass in a fibrous crystalline form, the crystals being felted or united together, the shellac regaining its original hardness. This composition is more particularly set forth in United States Patent No. 1,002,505, dated Sept. 5th, 1911. In forming the sound record, the liquid composition should be constantly agitated to prevent the segregation of the tetra-chloronaphthalene and may be flowed or otherwise located upon the base of the record and there allowed to harden.

A composition such as described above retains all the hardness of shellac, but has a greater toughness and elasticity than shellac and other qualities desirable in a composition for the formation of sound records. The toughness is largely due to the felted structure of crystals of tetra-chloronaphthalene in the shellac. It may be remarked that tetra-chloronaphthalene has perhaps the most powerful tendency of any organic substance to crystallize from amorphous materials.

The term "tetra-chloronaphthalene" is a trade designation for a product formed by the chlorination of naphthalene, which crystallizes as a felt of flexible, fibrous material. It apparently is a mixture of various chlorin substitution products of naphthalene probably the tri-, tetra-, and penta- chloronaphthalenes, having substantially the same average composition as tetra-chloronaphthalene.

As a suitable material for the base of my improved record, I prefer to use montan wax impregnated with about 7% of cotton flock. The above named wax is a substance of dark yellowish color somewhat resembling discolored carnauba wax and is obtained, as I am informed and believe, from certain kinds of bituminous brown coal by a certain process of extraction or solution. The so-called "montan wax" is imported into the United States from Germany and is a mineral wax obtained from certain kinds of bituminous brown coal by extraction with suitable solvents. Chemically, it consists of a mixture of hydro-carbon acids combined with fatty alcohols together with some free fatty acids and hydrocarbons. By the use of cotton flock or other fibrous material with the montan wax, I secure a high degree of durability for the base, the fibrous material being completely penetrated and inclosed by the wax-like material, and at the same time controlling in a degree the expansion and contraction of the base. If desired, inert powders may be mixed with the montan wax and flock to further control the expansion and contraction.

I have found that the specific compositions for the base with flock and for the surface material mentioned above have substantially the same coefficient of expansion so that there is no danger of the record becoming cracked under changes of temperature. I have also found that my improved record is so durable that it may be dropped or even thrown upon the floor with considerable force without encountering any objectionable injury. While, however, I prefer to use the specific composition mentioned, my invention is not limited thereto; and I wish it to be understood that my invention comprises all the modifications falling within the scope of the appended claims.

In order that my invention may be better understood, attention is directed to the accompanying drawing forming part of this specification and in which I illustrate a central longitudinal section of a cylindrical sound record constructed according to my invention.

In the drawing A represents the outer recording layer or surface formed of a hard tough composition such as the shellac and tetra-chloronaphthalene mentioned above, and B the base of cheaper material such as montan wax and cotton flock, and if desirable inert powders, such as chalk. While I have shown a cylindrical record, my invention is evidently applicable to disk records as well.

Having now described my invention, what I claim as new and desire to secure by Letters Patent is as follows:

1. A sound record comprising a surface portion of a resinous material having crystallized fibers distributed through the same, and a base of montan wax impregnated with fibrous material in such amount as to give the base substantially the same coefficient of expansion as said surface portion, substantially as described.

2. A sound record comprising a surface portion of shellac and a halogenized naphthalene crystallizing as fibers distributed through the shellac, and a base of montan wax impregnated with fibrous material in such amount as to give the base substantially the same coefficient of expansion as said surface portion, substantially as described.

3. A sound record comprising a surface portion of shellac and a halogenized naphthalene crystallizing as fibers distributed through the shellac, and a base of hard waxlike material impregnated with approximately 7% of fibrous material, substantially as described.

4. A sound record comprising a surface portion of shellac and a halogenized naphthalene crystallizing as fibers distributed through the shellac, and a base of montan wax impregnated with approximately 7% of fibrous material, substantially as described.

This specification signed and witnessed this 3rd day of April 1911.

THOS. A. EDISON.

Witnesses:
FREDERICK BACHMANN,
ANNA R. KLEHM.